Nov. 14, 1967 — C. E. CLELAND — 3,352,186
BLADE GUIDING AND SUPPORTING STRUCTURE FOR BAND SAWS
Filed Feb. 11, 1966 — 7 Sheets-Sheet 4
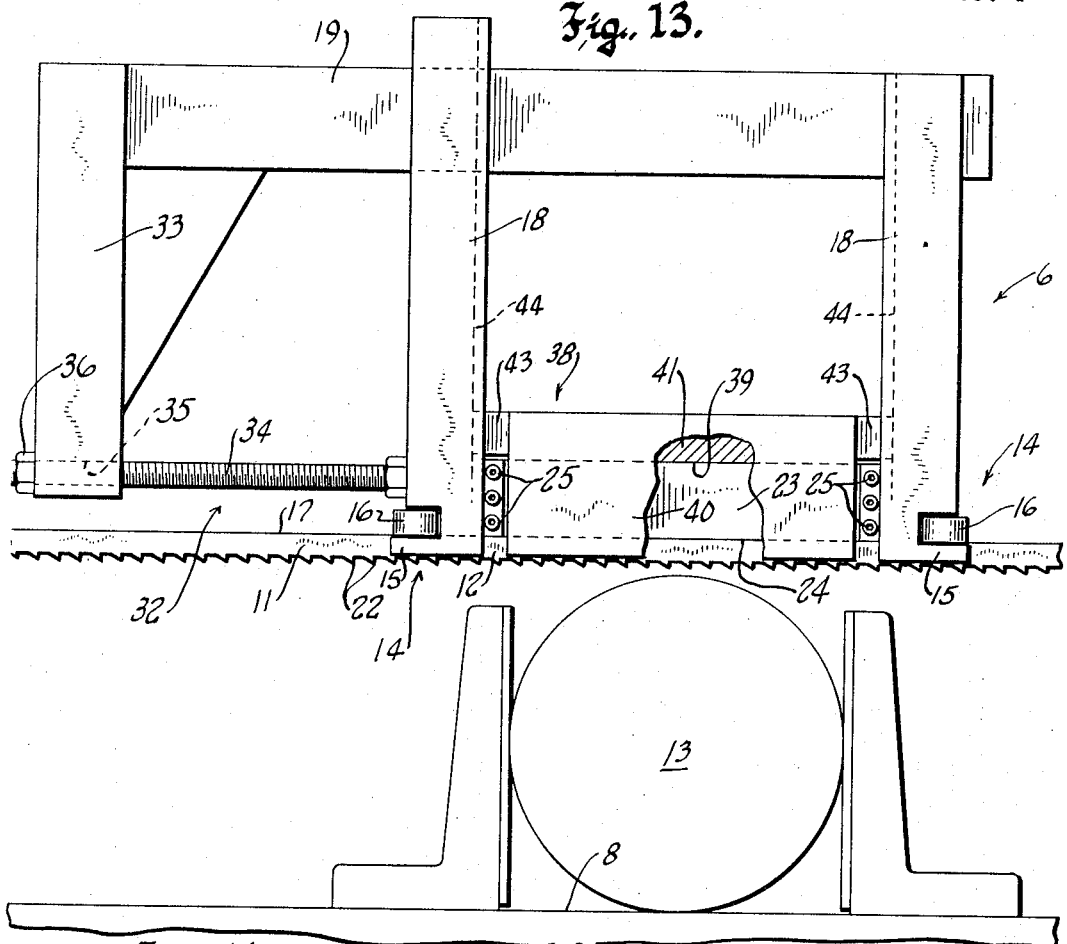
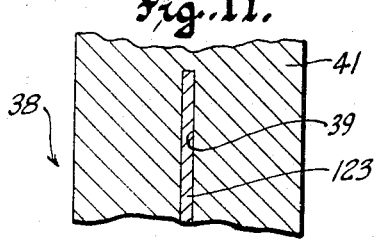
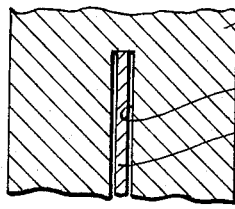
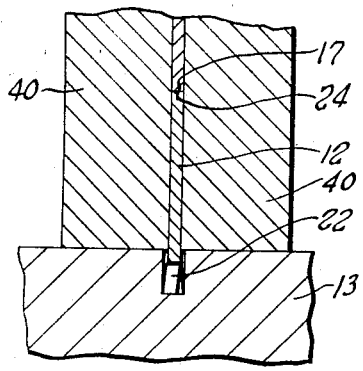
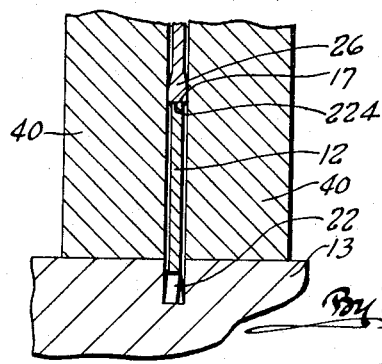
Inventor
Charles E. Cleland

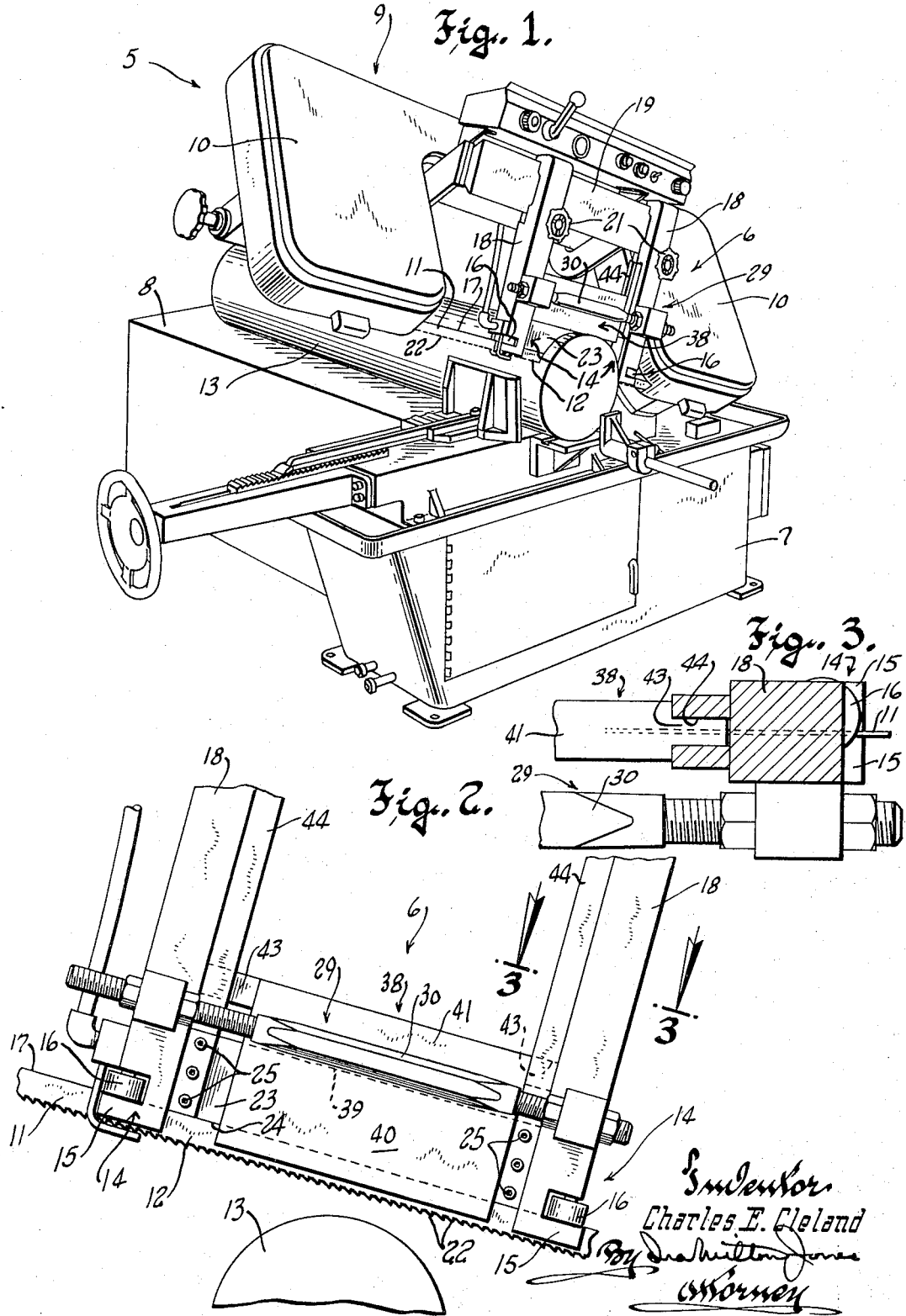

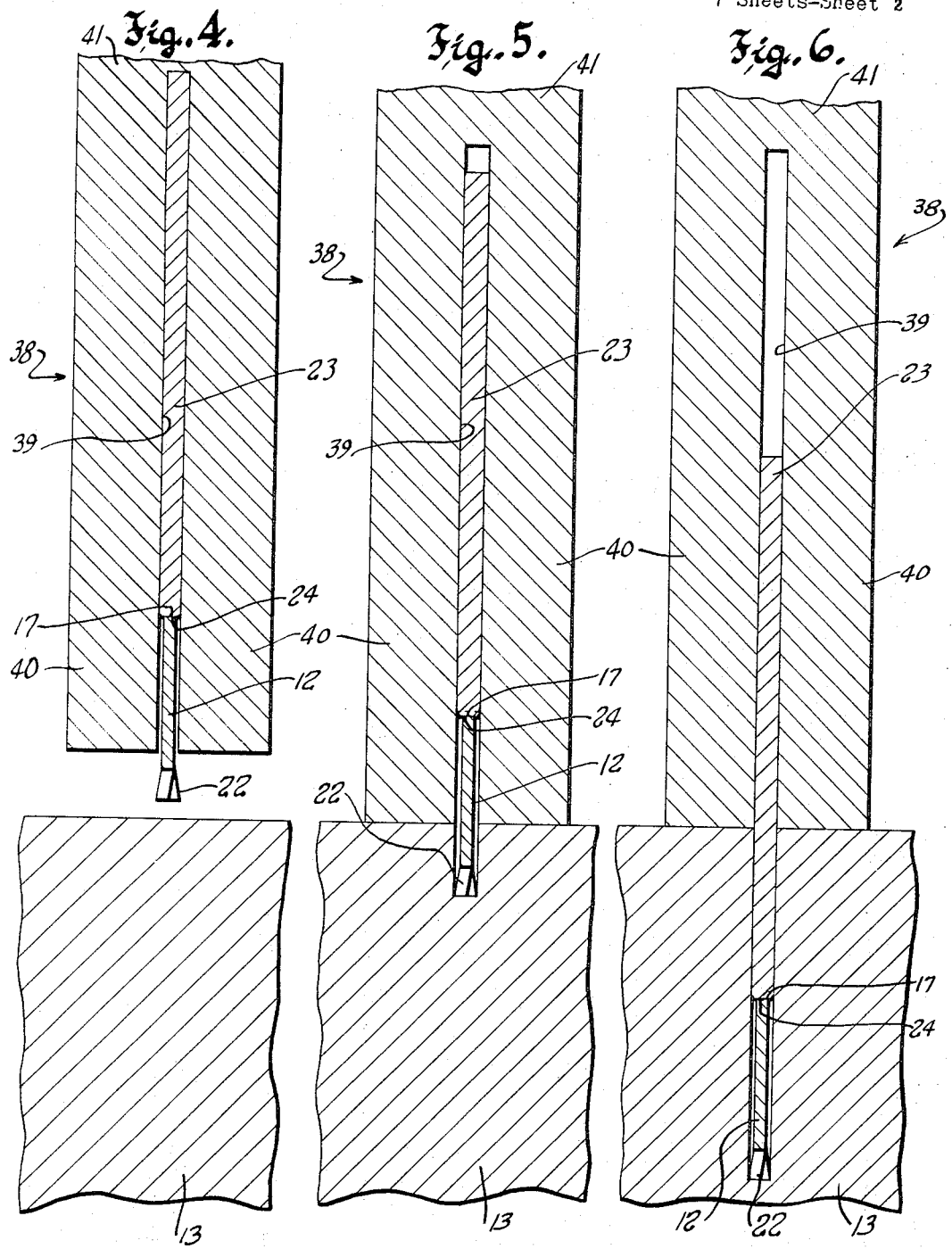

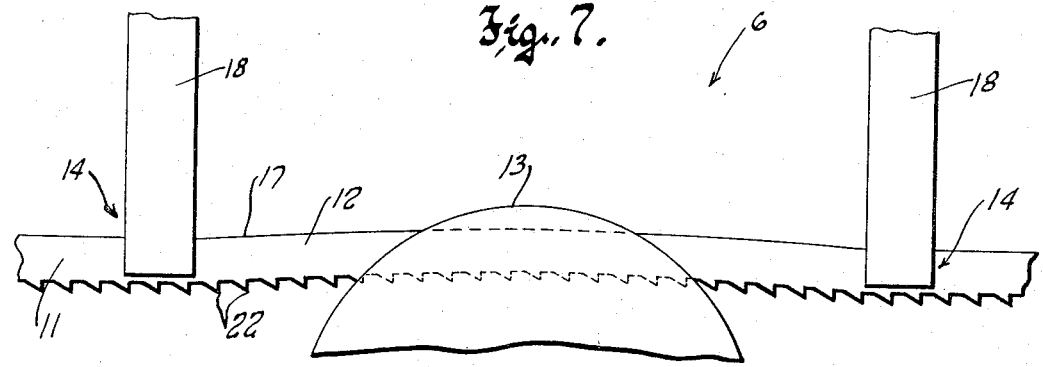
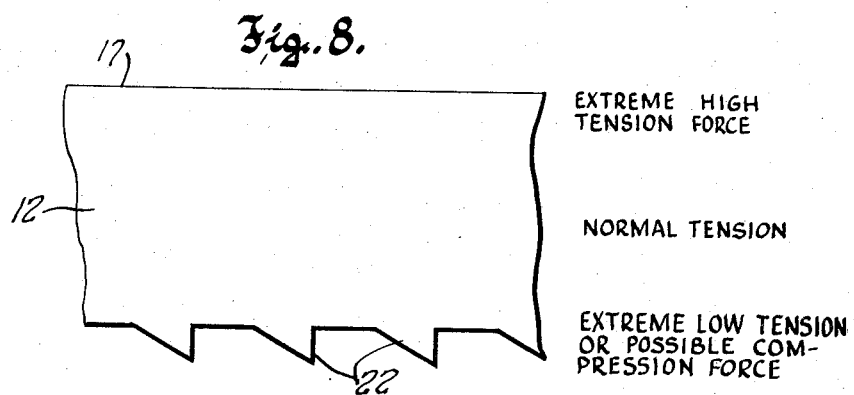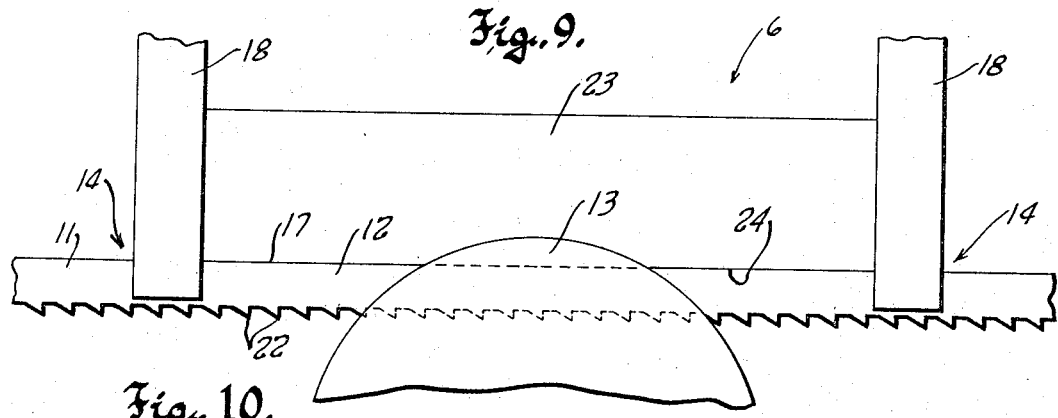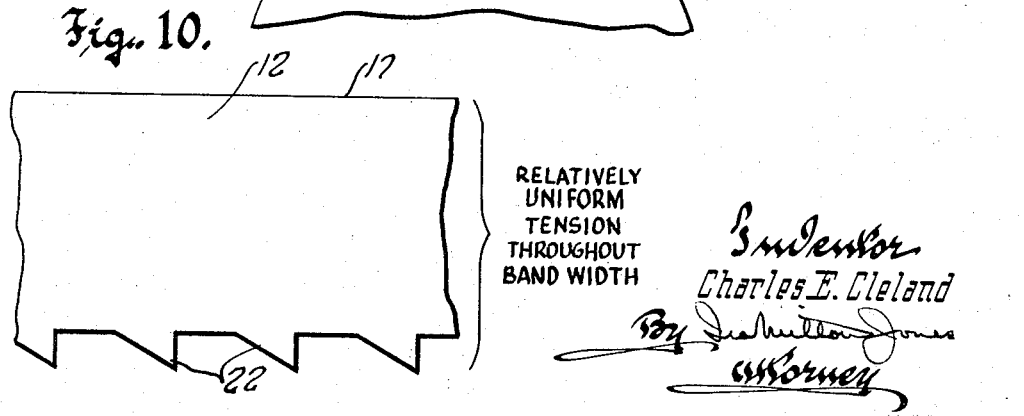

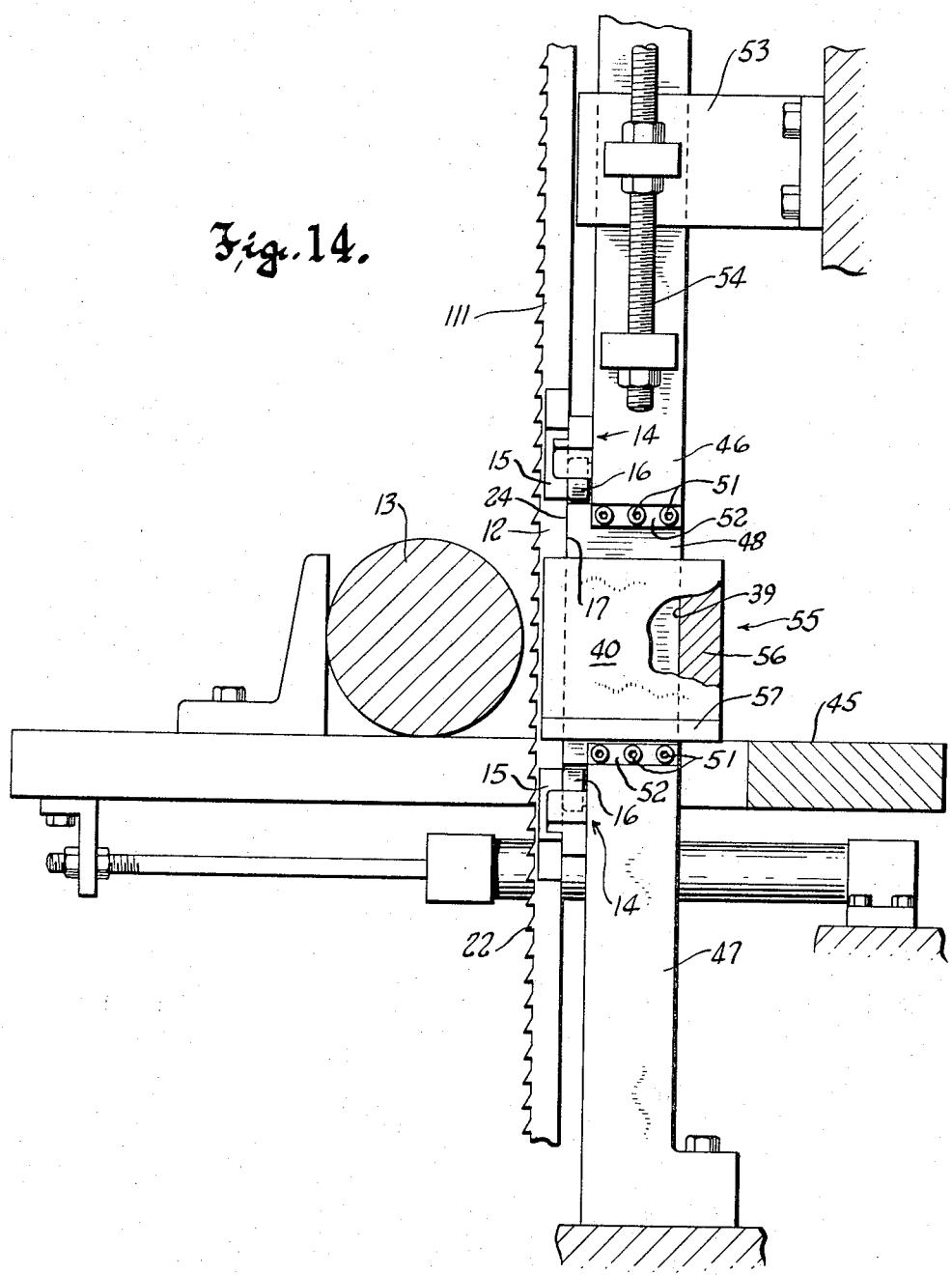

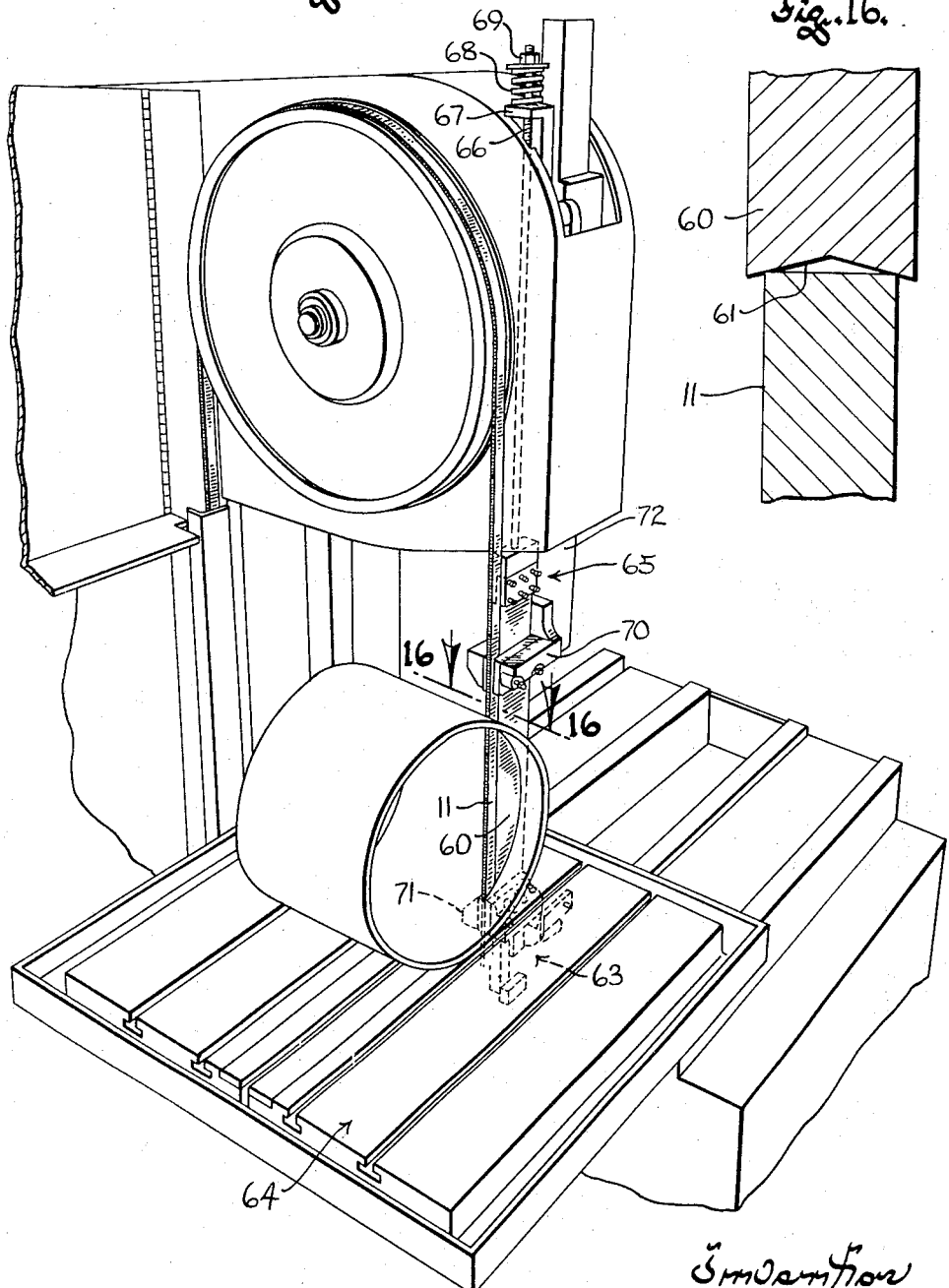
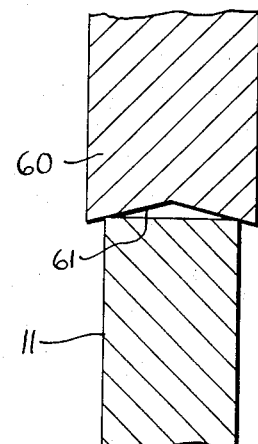

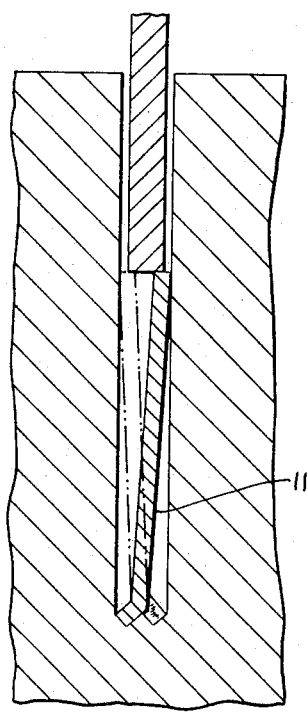
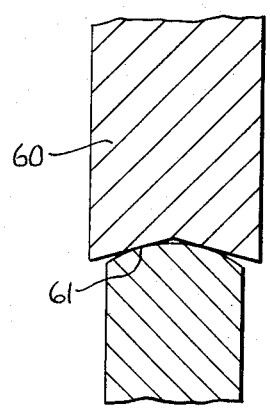
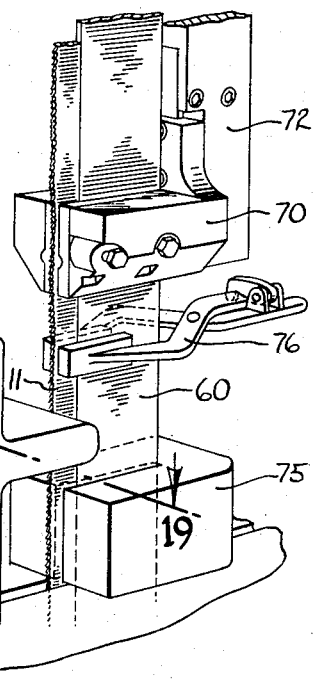
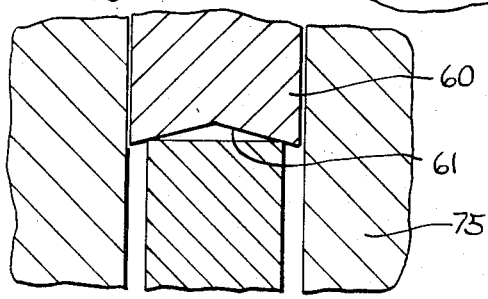

United States Patent Office

3,352,186
Patented Nov. 14, 1967

3,352,186
BLADE GUIDING AND SUPPORTING STRUCTURE FOR BAND SAWS
Charles E. Cleland, Minneapolis, Minn., assignor to Continental Machines, Inc., Savage, Minn., a corporation of Minnesota
Filed Feb. 11, 1966, Ser. No. 534,272
21 Claims. (Cl. 83—201.15)

ABSTRACT OF THE DISCLOSURE

A metal cutting band saw has its cutting span supported against the thrust of the work thereon by a backer band thin enough to follow the saw band into the kerf, but strong enough to carry work feeding loads much greater than those that could be safely applied to the saw band alone. The backer band is so mounted and held in coplanar relationship with the saw band that neither the backer band nor its mounting interferes with adjustment of the customary saw guides of the machine. Proper tracking relationship between the cutting span of the saw band and the backer band is assured by jaw-like guides.

---

This invention, like that of application Ser. No. 350,416, filed Mar. 9, 1964, and allowed Aug. 31, 1965, now abandoned, and of which this is a continuation-in-part, concerns band saw machines of the type wherein sawing of metal stock is performed by one stretch of an endless saw band or blade as it travels through a cutting zone. More particularly, this invention relates to improved structure for guiding and supporting the cutting span of the blade at the cutting zone.

In general, it is the purpose of this invention to provide blade guiding and supporting structure for a metal cutting band saw which makes possible significant increases in cutting rates with a saw blade of given width.

As is well known, the blade of a band saw comprises an endless saw band trained around spaced apart drive and idler pulleys and held thereby under substantial tension. One stretch of the blade passes through a cutting zone defined by spaced saw guides which constrain the cutting span of the blade therebetween to lineal travel. For this purpose, each of the saw guides usually comprises a pair of opposed shoes that firmly but slidingly engage the opposite faces of the blade to support its cutting span against lateral deflection during sawing, and a roller or the like to engage the back edge of the blade and thereby support the cutting stretch of the blade against the thrust of the work fed thereto.

With such conventional saw guiding and supporting structure, the cutting stretch of the saw blade is supported only at the ends of its cutting span. Hence, at the usual speeds of blade travel, the cutting rates (measured in square inches per minute) that could be achieved with a blade of given width (measured from back edge to cutting edge) was largely determined and limited by the beam strength of that portion of the blade which spans the space between the saw guides, or more particularly by the cutting span of the blade. Obviously, the beam strength of the cutting span varies with the distance between the guides, and this distance will of course depend upon the adjustment of the guides that must be made to accommodate work pieces of different girth. For example, using a 1″ (one inch) wide high speed steel blade with a tensile stress thereon of 30,000 p.s.i., and with the guides adjusted to accommodate a mild steel work piece or bar 4″ (four inches) in diameter, the cutting span of the blade between the guides will have sufficient beam strength to enable accurate sawing at a cutting rate of about 18 square inches per minute. However, when the guides are spaced to accommodate a 10″ (ten inch) diameter mild steel bar, the reduced beam strength of the longer cutting span of the blade necessitates so great a compensatory reduction in feed force that reasonably accurate sawing can not be achieved at cutting rates in excess of about 4 square inches per minute.

This reduction in feed force is necessary due to the edgewise deflection of the cutting span of the blade resulting from the feed force between the work and the blade during sawing. This deflection increases the tensile stress along the back edge of the blade and effects a reduction in the tensile stress along its toothed edge. In other words, the feed force between the cutting edge of the blade and the work being sawed tends to create compressive stresses on the toothed edge portion of the blade which offset its tensile stress.

When these compressive stresses cause substantial reductions in the tensile stress along the toothed edge of the cutting span of the blade, and correspondingly high increases in the tensile stress along its back edge, the accuracy of the sawing operation suffers. In fact, a crooked cut will invariably result if the tensile stress along the toothed edge of the cutting span of the blade approaches zero p.s.i., or if the toothed edge portion of the blade is actually in compression.

Heretofore, accurate sawing of the larger pieces of metal stock at acceptably high cutting rates, under the circumstances outlined, could be achieved only on much larger band saws designed to handle saw blades that are wide enough to have the necessary beam strength in the longer cutting spans of the blade. Thus, for instance, band saws such as the one illustrated in the Crane et al. Patent No. 2,898,669, which are designed to handle 24″ thick stock, the saw blade used was 2″ wide. These larger machines, of course, are not only quite expensive but take up much more floor space, which is often at a premium in crowded shops, to say nothing of the far greater cost of the wider saw blades.

Obviously, therefore, if the work which heretofore required 2″ or even 3″ wide saw bands could be cut at an acceptable rate with a 1″ wide saw band, the machine could be much smaller and far less expensive. This invention achieves this objective through the provision of improved saw guiding and supporting structure by which the entire span of the cutting blade is supported at the cutting zone against such edgewise flexure as hitherto limited sawing rates and/or resulted in inaccurate or crooked sawing.

More specifically, the purpose and object of this invention is attained by the provision of a substantially rigid backer band that has a thickness no greater than that of the toothed edge of the saw blade, and engages the back edge of the saw blade throughout the entire length of its cutting span and during the entire sawing operation to augment the beam strength of the saw blade and thus enable substantially higher cutting rates to be achieved without sacrificing or affecting the accuracy of the sawing.

In one of its more specific aspects, another feature and object of this invention resides in the provision of an entering or starting guide to hold the backer band and the cutting span of the saw blade against relative lateral movement during the time the saw blade enters a work piece being sawed and until the backer band has entered the kerf formed by the saw blade.

In another of its specific aspects, this invention has as an object the provision of very simple but effective guide means, in saw guiding and supporting structures of the character described, for at all times constraining the backer band and the cutting span of the saw band against lateral motion relative to one another, so that throughout the entire cutting operation, the saw blade is guidingly supported by the backer band.

The invention in its last mentioned aspect, rests upon the unexpected discovery that the cutting span of a saw band will track properly upon a backer band which is no thicker than the cutting edge of the saw band, or even no thicker than the saw band itself, provided the backer band is under sufficient lengthwise tension to prevent lateral deflection, and provided further that the edge of one of said bands is transversely concave to provide a shallow groove or track in which the opposing edge of the other band rides. This discovery was made in the course of tests that were fully expected to prove that an entering or starting guide was essential to prevent relative lateral displacement between the saw band and the backer band, and which were undertaken in the belief that a groove which could be formed in the edge of either band would not provide sufficient guiding engagement between the bands to assure the required tracking.

It developed, however, that instead of the expected displacement of the saw band from the backer, the provision of a shallow groove in one of the bands, specifically the backer, held the saw band "on track" and thus obviated the need for an entering or starting guide to hold the saw band and backer in coplanar relationship until the kerf could take over.

The unexpected perfect guidance which the shallow groove in the edge of the backer band provided for the saw band, moreover, was not the only surprise that these tests yielded. Two other advantages were gained, one was a smoother surfaced cut and the other, increased band life despite the significantly faster cutting rates made possible by the use of a backer band. The first of these advantages undoubtedly flowed from the fact that by preventing relative lateral displacement between the contacting edges of the saw band and backer band, not only during the start of the cut but also throughout its entire progress, the saw band is held against lateral or flatwise rocking.

When an entering or starting guide was used, the opposed slidingly engaging edges of the saw band and backer band were flat. Consequently, the back edge of the saw band could and apparently did slip or ride from side to side across the edge of the backer, causing the saw band to rock flatwise from side to side at regular intervals during the course of a cut. As a result, the cut surfaces instead of being flat as desired, had an undulated or wave-like formation with the crests of the waves substantially equispaced and parallel to the edge of the saw blade. While this wave-like pattern in the cut surfaces of the work was not objectionable in most cases because of the shallow depth of the undulations, it was obviously undesirable.

Surprisingly, it was found that when the backer band was provided with a transversely concave edge to slidingly receive the back edge of the saw blade, the surfaces of the cuts did not have the undesirable wave-like pattern. Hence the provision of this guiding interengagement between the bands not only achieved unexpected tracking of the saw band along the backer band, but had the further unexpected advantage of producing a smoother surfaced cut.

While the elimination of the wave-like pattern or undulated surfaces of the cuts that resulted from the use of a backer band without an interengaging guiding or tracking engagement between the saw band and the backer band is a valuable attribute of the discovery that was made when the aforesaid tests were conducted, the concomitant increased life of the saw band has far greater commercial significance. Any time the useful life of a tool as well as its cutting rate is doubled and trebled a milestone has been reached in the machine tool industry, especially when the cost of the tool is as appreciable as that of a metal cutting saw band. The full explanation of why the useful life of the saw band is so greatly increased despite the fact that it is cutting twice and three times as fast, will be given hereinafter; at this point it is only desired to point out that this very valuable improvement has been accomplished, and that it was fully unexpected.

Viewed in retrospect, it may be said, therefore, that although wholly unintended and unexpected, it is a feature of this invention that with a less costly narrower saw band, and hence a smaller machine, it is possible to do high quality work in less time than was heretofore possible, and at the same time to greatly extend the useful life of the saw blade.

Still another object of the invention resides in the provision of saw guiding and supporting structure of the character described, wherein a backer band of sufficient length to span the maximum spacing between the saw guides is held under substantially high tension lengthwise of the cutting span of the saw blade and in guiding engagement therewith, and wherein the saw guides not only embrace the saw blade but the backer band as well, so that the saw guides may be set to whatever spacing is best suited to the size of the work piece to be cut, without disturbing the backer band or its guiding support of the saw blade.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a perspective view of a band type cut-off saw incorporating one embodiment of the saw guiding and supporting structure of this invention;

FIGURE 2 is an enlarged elevational view of the saw guiding and supporting structure seen in FIGURE 1;

FIGURE 3 is a cross sectional view taken along the plane of the line 3—3 in FIGURE 2, but at a larger scale;

FIGURES 4, 5 and 6 are similar greatly enlarged cross sectional views taken through the saw guiding and supporting structure at the cutting zone, and respectively illustrating the cooperative relationship between its components at times just prior to entry of the saw blade into a work piece, just after entry of the blade into the work piece, and after the blade has cut a substantial distance into the work piece;

FIGURES 7 and 8 are diagrammatic views that indicate how edgewise flexure of the cutting span of a conventionally guided saw blade affects the tension stresses in the blade;

FIGURES 9 and 10 are diagrammatic views similar to FIGURES 7 and 8 but showing how the support of the cutting span of a saw blade in accordance with this invention, corrects the stress distribution in the blade and thereby assures the desired cutting accuracy.

FIGURES 11 and 12 are cross sectional views similar to FIGURE 5, illustrating slightly modified embodiments of the invention;

FIGURE 13 is an elevational view somewhat similar to FIGURE 2 but more or less diagrammatically illustrating the saw guiding and supporting structure in slightly different form;

FIGURE 14 is a somewhat diagrammatic elevational view illustrating one way in which the saw guiding and supporting structure of this invention can be incorporated in an upright band saw machine;

FIGURE 15 is a perspective view of a band saw machine of the type on which the aforementioned tests were conducted, equipped with a backer band to at all times guidingly support the cutting stretch of the saw blade, and showing the machine in the act of cutting through a relatively large diameter steel tube;

FIGURE 16 is a cross sectional view, on an enlarged scale, through the saw blade and the adjacent portion of the backer band, on the plane of the line 16—16 in FIGURE 15;

FIGURE 17 is a detail cross sectional view similar to FIGURE 16, but showing a slightly modified version of the guiding interengagement between the saw blade and the backer band;

FIGURE 18 is a perspective view of a portion of the machine shown in FIGURE 15 illustrating the use of entering or starting guides in conjunction with the guide track on the backer band, to positively constrain the saw blade and backer band to coplanar relationship;

FIGURE 19 is an enlarged fragmentary cross sectional view through FIGURE 18 on the plane of the line 19—19; and FIGURE 20 is a cross sectional view through the saw band and the contiguous portion of the backer band without a guide track, to illustrate how, in the absence of the guide track, the saw blade can rock from side to side causing it to form an undulatory surfaced cut.

Referring now more particularly to the accompanying drawings, the numeral 5 designates generally a cut-off type band saw machine equipped with saw guiding and supporting structure 6 of this invention. As will appear as the description proceeds, the saw guiding and supporting structure 6 can be incorporated in any known type of band saw, but in FIGURE 1 it is shown installed on what has become known as a scissors type cut-off machine having a base 7 providing a work supporting table 8, and a more or less horizontal cutting head or frame 9 that is pivotally carried by the base for up and down swinging movement relative thereto.

The cutting head or frame 9 comprises a rigid substantially flat hollow C-shaped structure having enlarged end sections 10 which enclose and rotatably support spaced apart band wheels or pulleys, not shown, one of which is power driven so as to impart orbital motion to an endless saw band trained around the pulleys. In the scissors type machine illustrated, the cutting head or frame 9 is tilted to dispose the lower or cutting stretch 11 of the saw band forwardly of its upper stretch.

The right hand end of the cutting head (FIGURE 1) is pivotally connected to the base and sawing is performed by the lower stretch 11 of the saw band during downward scissors closing motion of its left hand end toward the work supporting table 8. A hydraulic cylinder or the like, not shown, can be connected between the cutting head and the base to regulate the descent of the head and consequently the sawing action, and to also lift the head upwardly at the conclusion of a sawing operation.

That portion 12 of the cutting stretch 11 by which sawing of a work piece 13 on the table is performed, and which will hereinafter be referred to as the cutting span of the blade, must be held with its flat sides perpendicular to the work supporting table 8 in order to assure a straight vertical cut through the work piece when the cutting head descends. The cutting stretch of the blade, therefore, must be held in a partially twisted condition, and for this purpose it is constrained to travel lengthwise between spaced saw guides 14 which form part of the saw guiding and supporting structure 6 of this invention, and which are rigidly carried by the cutting head or frame 9.

Each of the saw guides 14 can comprise a conventional arrangement of opposed shoes 15 which firmly but slidingly engage the opposite faces of the cutting stretch of the saw band, and a roller 16 mounted to have one axial face thereof engage the back edge 17 of the blade. Rollers similar to the roller 16, of course, can be used in place of the shoes 15 illustrated, in which case the peripheries of the rollers tightly engage the opposite faces of the saw band. In either event, the guides 14 are mounted on the lower ends of arms 18 having their upper ends secured to a beam 19 that forms part of the rigid frame structure of the cutting head and extends parallel to the cutting stretch 11 of the saw band.

The arms 18 may be movably mounted on the beam 19 for adjustment along the length thereof in more or less conventional fashion, and they can be releasably clamped to the beam in any desired spaced relationship to one another to thus define the length of the cutting zone by means under the control of hand wheels 21.

The arms 18, of course, are so mounted on the beam 19 that they are rigidly held parallel with one another at all times, and the saw guides comprising the pairs of shoes 15 mounted on their outer ends are oriented to hold the cutting stretch of the blade so twisted that its cutting span is edgewise vertical and perpendicular to the work supporting table 8, and its toothed edge 22 is lowermost. During sawing, the shoes 15 minimize sidewise or lateral deflection of the cutting span 12 of the blade between the lower ends of the arms 18 and the rollers 16 tend to minimize edgewise deflection of the blade. In the scissors type band saw machine illustrated, feed force is applied to the cutting stretch of the saw band by the engagement of the rollers 16 with the back edge of the blade, during controlled descent of the cutting head in the manner described hereinbefore.

The more or less conventional saw guiding and supporting structure described thus far is somewhat diagrammatically illustrated in FIGURE 7, where it will be seen that the cutting span 12 of the blade is left unsupported against both edgewise and lateral deflection in the cutting zone defined by the space between the saw guides 14. Heretofore, the tension on the saw blade was relied upon to limit lateral and edgewise flexure of the unsupported span 12 of its cutting stretch, and in a band machine having a 1″ wide saw blade, for example, it was not unusual but quite common to maintain a tensile stress of about 30,000 pounds per square inch on the blade.

Despite this high tensile stress on the blade, it was impossible to achieve satisfactorily high cutting rates on metal stock such as bars other than those of relatively small diameters, or except in cases where the saw guides 14 engaged lengthwise spaced portions of the cutting stretch of the blade that were relatively close together so that the cutting span 12 of the blade was correspondingly short and, accordingly, had high beam strength.

If during sawing of larger work pieces with a correspondingly longer unsupported cutting span 12, the feed force on the cutting span of the saw blade caused it to flex edgewise, upwardly as indicated in somewhat exaggerated form in FIGURE 7, a crooked saw cut invariably resulted. This was due to the fact that the normal tensile stress on the blade was no longer uniform across the width of its cutting span. FIGURE 8 illustrates by legends that the edgewise flexed cutting span of the blade stretched along its back edge to develop extremely high tension stresses therein, while the tensile stresses in the middle portion of the band intermediate its back and toothed edges remained somewhere near normal. Most objectionable, however, was the fact that the tension stresses along the toothed edge 22 of the blade were drastically reduced, and the cutting edge of the blade could actually go into compression if the feed forces were great enough. It was this substantial reduction in stress along the toothed edge 22 of the blade that rendered it unstable and resulted in crooked sawing.

From this it will be apparent that reasonably accurate sawing at satisfactorily high cutting rates and with narrow saw blades could be obtained in the past only if the cutting span was short, and that much larger machines with wide saw blades having increased beam strength were necessary to cut through bar stock of substantially large diameter or girth at acceptably high cutting rates.

The saw guiding and supporting structure 6 of this invention overcomes this limitation on cutting rates through the provision of an elongated backer band 23 for the saw blade, having one longitudinal edge 24 in engagement with the back edge 17 of the cutting span 12 of the blade. The backer band 23 has a thickness no greater than that of the toothed edge 22 of the saw band, and hence no greater than the width of the kerf sawed thereby. The width of the backer band is preferably at least as great as that of the saw band, and it can be two to three or more times as wide as the saw band measured from its back to its toothed edge. If necessary the lower edge 24 of the backer band, which engages the back edge of the blade, may be hardened or faced with a hard material for resistance to wear.

It is important that the backer band be rigidly mounted in coplanar relation to the cutting span of the saw blade, and in edgewise engagement with the back edge thereof. Any suitable means may be employed for this purpose. In the machine illustrated in FIGURE 1, however, the backer band is shown extending lengthwise between the lower end portions of the arms 18 to have its opposite ends secured thereto as by screws 25 which rigidly hold the band coplanar with the cutting span 12 of the saw blade.

The backer band adds materially to the beam strength of the cutting span of the saw blade, and being no thicker than the toothed edge 22 of the blade, it can follow the blade through the kerf sawed thereby in the manner shown in FIGURES 4, 5 and 6, which illustrate a backer band having a uniform thickness substantially equal to the toothed edge 22 of the saw blade. Hence, the backer band remains in edgewise contact with the back edge 17 of the cutting span of the blade during the entire cutting operation to prevent such edgewise flexure of the band as heretofore resulted in inaccurate and crooked sawing, and to enable cutting rates far exceeding those possible with conventional saw guiding and supporting structures.

FIGURES 9 and 10, for example, illustrate that during a sawing operation on a work piece 13 of substantial girth, the feed force essential to sawing at satisfactorily high rates can be applied to the cutting span of the saw blade without danger of the blade flexing upwardly as shown in FIGURE 7, so that the cutting span of the blade will have substantially uniform tensile stresses throughout its width to assure straight line sawing.

The backer band 23 is preferably tensioned lengthwise to impart tensile stresses thereto comparable to or even higher than those in the cutting stretch of the saw band. Such tensioning of the backer band may be accomplished in many different ways that will undoubtedly suggest themselves to persons skilled in the art. As herein illustrated by way of example, a turnbuckle mechanism generally designated 29 is shown connected between the lower end portions of the two guide arms 18 so that force may be applied thereto tending to spread the same apart upon turning of the central nut 30 of the turnbuckle in the proper direction. This turnbuckle mechanism is mounted forwardly of the plane of the cutting span of the saw blade and, therefore, can limit the thickness of the slice to be sawed off of a work piece 13.

While this is satisfactory for cutting relatively thin slices off of the work piece, another form of tensioning device generally designated 32 in FIGURE 13 enables proper tensioning of the backer band without placing any limitation of the thickness of the slice that can be sawed from the work piece 13. The tensioning device 32 comprises a third arm 33 rigidly affixed to the beam 19 in spaced relation to one of the arms 18 substantially directly over the cutting stretch 11 of the blade, and an elongated screw 34 having one end anchored in the adjacent arm 18 and its other end passing through a hole 35 in the lower end of the arm 33 so that tightening of a nut 36 on said other end of the screw tends to pull the adjacent arm 18 toward the arm 33 and thus effect the desired tensioning of the backer band.

It is, of course, essential that some means be provided for constraining the cutting span of the saw band to track along the backer band, at least until cutting has progressed to the point where the backer band has entered the kerf, after which the side surfaces of the kerf can be relied upon to cooperate with the backer band and saw band to maintain them in coplanar relationship. In the embodiment of the invention illustrated in FIGURES 1–6 and 11–14, such tracking during the initial portion of the cut is provided for by means of an entering or starting guide generally designated 38. The entering guide operates in the space between the arms 18 of the supporting structure 6, and as shown in FIGURES 1–6 and 11–13, it may comprise a block of suitable metal having a deep and narrow slit 39 therein opening to its underside, to closely slidably receive the backer band 23 and substantially the entire cutting span of the blade rearwardly of its toothed edge. The slit 39 defines a pair of rigid jaws 40 having substantially flat opposing surfaces that are contiguous to the opposite faces of the backer band and the saw blade. The jaws are joined together at their upper ends by an integral bight portion 41 of the block, so that the entering guide normally straddles the backer band to have its bight portion rest upon the upper edge of the backer band, and its jaws 40 extend beyond the lower edge 24 of the backer band and over the sides of the cutting span of the blade, rearwardly of its toothed edge. It may be biased to this normal position by springs or the like, but in the scissors-type machine illustrated in FIGURE 1, such bias is provided by gravity.

The entering guide must be movable relative to the backer band in the flat plane thereof during sawing, and while the backer band itself can constrain the guide to such movement, in the machine shown in FIGURE 1, the entering guide is further constrained to such motion by ears 43 on its ends that engage in parallel channels 44 on the opposing faces of the guide arms 18. Hence, during sawing, the cutting span of the saw blade and the backer band behind it move out of the slit 39 in the entering guide as the saw cuts into the work piece (see FIGURES 5 and 6) and as this takes place, the entering guide keeps the saw blade from slipping off the edge of the backer band (see FIGURES 4 and 5). Edgewise supporting engagement of the backer band with the saw blade as the latter enters the work piece being sawed is thus assured, and after the backer band follows the blade into the kerf sawed thereby, the blade and backer band are held against relative lateral displacement by the side surfaces of the saw cut itself, as seen in FIGURE 6.

As will be appreciated, a backer band of given width provides maximum reinforcement for the cutting span of the saw blade when it has a uniform thickness substantially corresponding to or but slightly less than that of the saw blade at its toothed edge 22, as shown in FIGURES 4, 5 and 6. However, it is also possible to obtain adequate reinforcement for the cutting span of the blade with a backer band that has a thickness less than the width of the kerf cut by the saw blade, in which event it is only necessary to increase the width of the backer band to maintain the desired beam strength. All factors considered, it has been found that a length to width ratio of fifteen to one (15 to 1) will be about correct for most installations.

FIGURE 11 illustrates a backer band 123 which has a thickness equal to that of the saw blade measured adjacent to its back edge, and it will be appreciated that the backer band could just as well be made thinner than the saw blade without departing from the spirit of the invention, as long as the required beam strength is maintained. In the FIGURE 11 embodiment, of course, the slit 39 in the entering guide 38 will be narrower, to slidingly but snugly engage the sides of the saw blade and the backer band, as shown.

FIGURE 12 illustrates a condition where the slit 39 in the entering guide has the same width as that shown in FIGURES 4, 5 and 6, but the backer band 223 is thinner and has a wider hardened facing 224 on its lower edge to engage the back edge of the cutting span of the saw blade. Obviously, of course, the width of this facing must not exceed that of the toothed edge 22 of the saw blade, so as to allow the backer band to follow through the kerf cut by the saw and to be guided by the sides of the kerf after the facing follows the saw blade into the cut. The jaws 40 of the entering guide would then have snug but sliding engagement with the sides of the facing, to thus maintain the backer band and saw blade in edge to edge engagement while the blade enters the work being sawed.

FIGURE 14 illustrates how saw guiding and supporting structure of this invention can be incorporated in a vertical band saw, wherein the cutting stretch 111 of the saw blade is constrained to travel in a vertical path through a slit in a horizontal work supporting table 45. In machines of this type, the usual saw guides 14 are mounted on vertical upper and lower posts 46 and 47, respectively, that are rigidly carried by the frame of the machine. The lower guide 14, of course, is mounted below the work supporting surface of the table, while the upper guide 14 is located a distance above the work table; and while the spacing of these guides determines the length of the cutting span of the saw blade, as before, the cutting zone is defined by the space between the upper guide 14 and the top of the work supporting table 45.

The backer band 48 for the vertical machine shown in FIGURE 14 may be like any of those shown in FIGURES 4, 5, 6, 11 or 12, and it has a length to span the space between the posts 46 and 47. As hereinafter described, the backer band is mounted with its sides parallel to those of the cutting span of the saw blade between the guides 14, and with its forward edge 24 in engagement with the back edge 17 of the saw blade. One way in which this may be accomplished is suggested in the drawing, where the upper and lower end portions of the band are shown rigidly attached by screws 51 to ears 52 on the ends of the posts. The upper post 46 is ordinarily vertically adjustably received in a support 53 that is fixed with respect to the frame of the machine, and which support can be connected by one or more screws 54 with the post 46 to enable the backer band to be placed under tensile stress comparable to or greater than that on the saw band.

As before, an entering or starting guide 55 is used during the start of a saw cut, to prevent relative lateral movement between the backer band and the cutting span of the saw blade out of edge to edge force transmitting engagement. The entering guide may be constructed as previously described, with jaws 40 that extend forwardly along the opposite sides of the backer band and over the sides of the saw blade rearwardly of its toothed edge, and which jaws are contiguous to the side surfaces of both the band and blade. The jaws are rigidly connected by an integral bight portion 56 that can engage the rear edge of the backer band to prevent the jaws from contacting the toothed edge 22 of the saw blade.

If necessary, the entering guide 55 can be connected to the upper post 46 in a manner that allows it to move back and forth on the backer band in the plane thereof, and the backer band itself can be relied upon to constrain the entering guide to such motion. But as shown, the entering guide has a flat base 57 by which it is slidably seated upon the top of the work supporting table 45. This allows the entering guide to be manually engaged over the backer band and the saw band at the start of a cut, and held in place by an attendant of the machine until such time as the forward edge of the backer band has entered far enough into the kerf to be guided thereby. After that, the bands are held by the saw kerf against lateral shifting out of edgewise engagement so that the entering guide can be removed and need not be employed until the next sawing operation is about to be started.

While it was originally supposed that an entering or starting guide had to be employed to keep the saw band from slipping off the edge of the backer band until the backer band entered the kerf, the tests referred to hereinbefore, and which were actually undertaken to prove that an entering guide was necessary, demonstrated that the bands would remain in edge to edge coplanar tracking engagement if one of the edges was shaped to provide a shallow concave track for the other edge to ride in, provided that the backer band was under sufficient tension to hold it straight. The machine illustrated in FIGURE 15 employs no other means for keeping the cutting stretch 11 of its saw band on the backer band 60.

As seen best in the enlarged cross sectional view, FIGURE 16, the entire front edge of the backer band 60 is formed into a shallow V-shaped groove 61, while the back edge of the saw band is unmodified, that is, flat with substantially square corners. The groove 61 was ground into the edge of the backer band and its sloping sides define an obtuse angle of about 120°. Although the specific angle defined by the sloping walls of the groove is not critical, and might be anything between 60° and 160°, the angle must be uniform for the entire length of the backer band; and for a reason to be hereinafter explained, it is preferable to have the sloping sides of the groove extend uninterruptedly to the sides of the backer band.

Also, the grooved edge of the backer band should be somewhat wider than the back edge of the saw band, to assure that the edge of the saw band will ride in the groove and not on the outer extremities or edges thereof. However, if the back edge of the saw band is ground to a convex cross section, as shown in FIGURE 17, it is not too important to have the grooved edge of the backer band wider than the edge of the saw band which rides therein, and if both edges have a mating V-shape, maximum guidance will be had.

A curved or round bottomed groove in the backer band, and either a square flat back edge on the saw band provided it is narrower than the grooved edge or a mating rounded back edge on the saw band, also could be employed; and except for its obvious impracticability from the standpoint of production, the groove could be in the saw band.

Preferably, the grooved edge of the backer band should be hardened to increase its wear resistance.

The backer band 60 may be mounted and tensioned in the manner shown in FIGURES 1 and 2 or as in FIGURE 14, in which case the distance between the saw guides 15 is fixed by the length of the backer band, but in the machine shown in FIGURE 15, the mounting and tensioning of the backer band is effected in a way which allows the distance between the saw guides to be adjusted. Thus, as shown, one end of the backer band, specifically its lower end, is firmly attached as at 63 to a portion of the main frame of the machine, beneath its table 64, while its other end is secured, as at 65, to the lower end of a tension rod 66 which extends upwardly through the overhanging arm 67 of the machine frame to have tension applied thereon by a strong spring 68. This spring is confined between a ledge on the arm 67 and a nut 69 threaded on the rod 66 and by which the tension on the backer band may be adjusted.

It should be noted that the backer band is long enough to span substantially the entire height of the work zone so as not to reduce the capacity of the machine.

Upper and lower saw band side guides 70 and 71 are provided, but since the backer band supports the entire work performing stretch of the saw band against the thrust of the work thereon, no other rear edge support is needed for the saw band. Accordingly, both side guides may embrace the backer band as well as the saw band rearwardly of its toothed edge, and the upper side guide 70 which is fixed to the customary vertically movable post 72, can be adjusted up and down to enable the same to be located as close to table top as the work to be cut will allow. While the ability to adjust the distance between the side guides 70 and 71 may not be too significant in a band sawing machine like the one shown in FIGURE 15 wherein the cutting stretch of the saw band is not twisted, it is a valuable asset in machines such as the one shown in FIGURE 1 and in the Crane et al. Patent No. 2,898,669, since the closer the side guides can be brought together, the longer will be the stretches of the band in which the twist occurs, and obviously the longer that distance is the less will be the strain on the band due to the twisting.

The twist in the cutting stretch of the saw band in those machines which require it is the reason the groove in the front edge of the backer band must be shallow and why its sloping sides should extend to the sides of the backer band. Inasmuch as the stretch of the saw band between its side guides is coplanar with the backer band, there is no problem in having the back edge of this portion of the saw band ride in the groove, but for this portion of the saw band to be seated in the groove requires that the back edge of the twisted portion of the saw band which approaches the cutting zone shall freely enter the groove and that the back edge of the twisted portion of the saw band leaving the cutting zone shall freely leave the groove. A groove with parallel sides would thus interfere with smooth entry and exit of the saw band into and out of the groove and might, in fact, create destructive binding. Moreover, when it is borne in mind that the thickness or guage of the conventional band saw blade is only thirty-five thousandths of an inch (.035″) and that the backer band may not be thicker than the width of the kerf cut by the saw and preferably should not project more than three or four thousandths of an inch beyond the side faces of the saw band, it is not difficult to appreciate that the groove of necessity must be shallow.

Nevertheless, experience has conclusively demonstrated that it is possible and practicable to depend solely upon the interengaging sliding connection between the grooved front edge of the backer band and the back edge of the saw band—either in its unmodified condition, or ground to a convex or crowned cross sectional shape—to guide and keep the saw band on the backer band.

Where the shape of the part to be cut is such that the side guides of the saw must be widely spaced to accommodate the work piece but the initial cutting action must take place in a narrow part of the work piece so located that it makes contact with the saw band at a point spaced quite far from the side guides, as shown for instance in FIGURE 18, it may be desirable to employ an entering or starting guide like the guide 75 (FIGURE 18), and even another entering or starting guide 76 in the form of a locking type of pliers, with flat jaws which clamp onto the backer band and embrace the saw band, as also shown in FIGURE 18. In this case, proper tracking of the saw band on the backer band is doubly assured.

As noted hereinbefore, when the backer band was provided with a shallow convex track in its front edge, it was found that the surfaces of the cut no longer had the undulated "washboard-like" formation that characterized the work produced with a band saw provided with a backer band as shown in FIGURES 1–6 and 11 to 14. No doubt the explanation for this difference lies in the fact that because of the guidance provided by the groove in the front edge of the backer band, the saw band was constrained against sliding back and forth across the edge of the backer band whereas without the guidance provided by the groove, the saw band could and no doubt did, slide from side to side across the edge of the backer band, as depicted in FIGURE 20. The resulting flatwise rocking of the saw band would, of course, be limited by the sides of the kerf, but it would be sufficient to cause the saw to cut first to one side and then the other of its intended straight path, with the result that the surfaces of the cut had an undulating contour.

It follows, therefore, that even if an entering or starting guide is employed, it is advantageous to constrain the back edge of the saw band to exactly straight line motion by having its back edge ride in a groove in the front edge of the backer band.

The increased useful life which this invention has given saw bands is believed to result from the elimination, or at least the reduction, of edgewise vibration of the saw band brought about by supporting the band against edgewise deflection along the entire length of its cutting stretch, but whatever the reason may be, it is a fact that saw bands operated in accordance with this invention both with and without the benefit of the sliding interengagement between the saw band and the backer band, but especially with it, have considerably longer useful life. For instance, it was found that in cutting die steel which contains significant percentages of chromium or manganese, and is therefore a "work hardening" steel, the life of a one inch (1″) saw band operated with the benefit of this invention was three times that of a two inch (2″) band operated in the conventional manner without the benefit of this invention, despite the fact that the cutting rate for the narrower band was three times greater.

In an effort to learn why a saw band operated in a machine equipped with this invention had such greater useful life, its teeth were examined under a microscope and photographed. This revealed that the wear on all of the teeth was uniform, whereas a similar microscopic examination of the teeth of the wider band operated without the benefit of this invention revealed that the teeth were not uniformly worn. From this it is believed that unless edgewise vibration is eliminated the teeth sometimes cut and sometimes merely rub the work; and where the metal being cut is a work hardening steel, such rubbing hardens the steel and makes it more difficult for following teeth to cut.

In cutting mild steel solids, the greatly increased cutting rate without loss of accuracy results from the greater beam strength which the backer band provides. This makes it possible to apply greater feed force.

In the cutting of structural shapes and tubing, the backer band dampens vibration so that a saw of finer pitch may be used, and this reduces tooth loading and again results in longer life. By comparison without a backer band a coarser pitched saw band would have to be used to cut through flanges without injurious high frequency vibrations, but the coarser pitch results in overloading of the teeth when the saw cuts through the web. The dampening or elimination of vibration achieved by this invention thus enables the most effective saw pitch to be employed.

From the foregoing description taken in connection with the accompanying drawings, it will be apparent to those skilled in this art that this invention significantly benefits both the manufacturers and users of band saws and therefore has considerable economic value.

What is claimed as my invention is:

1. In a band saw machine having a cutting head with an endless flexible saw band thereon providing a cutting blade one stretch of which is constrained to endwise linear travel through a cutting zone:
 (A) saw guide means mounted on the cutting head and engageable with lengthwise spaced portions of said stretch of the saw band to define the cutting zone, and whereby that portion of the band between the guide means constitutes the cutting span of the blade;

(B) a substantially flat backer band having a thickness no greater than that of the toothed edge of the blade, a length substantially corresponding to that of the cutting span of the blade, and a width at least as great as that of the blade;

(C) means mounting the backer band on the cutting head in coplanar relation with the cutting span of the blade and in edgewise engagement with the back edge thereof so that the reaction force between the cutting edge of the blade and work being sawed is transmitted to and borne by the backer band and the latter thus limits edgewise flexure of the cutting span of the blade;

(D) an entering guide having spaced jaws to closely flatwise embrace substantial portions of the backer band and the cutting span to hold the same in coplanar relation during entry of the cutting edge of the blade into work being sawed;

(E) and means fixed with respect to the cutting head mounting the entering guide for movement relative to the backer band and the cutting span in directions substantially normal to the back edge of the cutting span of the blade but in the flat plane of the backer band so that the latter can follow the cutting span of the blade out of the space between the jaws as sawing through a work piece progresses.

2. Blade supporting structure for a band saw machine of the type having a frame with an endless flexible saw band mounted thereon and providing a cutting blade one stretch of which travels endwise through a cutting zone, comprising:

(A) blade guide members on said structure embracing the opposite faces of said stretch of the blade at each of two locations spaced lengthwise of the blade;

(B) an enlongated substantially flat backer band fixed on said structure and extending lengthwise along the span of the blade between said guide members, in coplanar relation to the blade and with one edge of the backer band in engagement with the back edge of said span of the blade to reinforce the same against edgewise deflection during sawing, said backer band having no greater thickness than that of the cutting edge of the blade;

(C) and means defining an entering guide which is movable relative to the backer band, said entering guide comprising spaced jaws having surfaces that are contiguous to the opposite faces of the backer band and to said span of the saw blade inwardly of its cutting edge so that the jaws constrain the entering guide to motion along a path parallel to the faces of the backer band and hold the band and blade substantially coplanar until the blade and an adjacent portion of the backer band have entered the kerf in a work piece being cut by the saw blade, whereby the kerf can thereafter hold the blade and backer band in substantially coplanar relation as the latter follows the blade through a work piece being sawed.

3. The blade guiding and supporting structure of claim 2, further characterized by means on the frame connected with the backer band to hold the same under tension lengthwise of the band.

4. The blade guiding and supporting structure of claim 2, wherein said entering guide is yieldingly biased toward the cutting edge of the blade:

and further characterized by cooperating stop means on the entering guide and the guiding and reinforcing structure to preclude bias produced motion of the entering guide beyond a position at which said jaws thereof are spaced a small distance rearwardly of the cutting edge of the saw blade.

5. The blade guiding and supporting structure of claim 2, wherein the edge of the backer band that engages the back edge of the cutting span of the saw blade has a thickness substantially equal to that of the blade at its cutting edge:

and wherein the remainder of the backer band has less thickness.

6. The blade guiding and supporting structure of claim 2, wherein the edge of the backer band that engages the back edge of the cutting span of the saw blade is hardened to resist wear.

7. The blade guiding and supporting structure of claim 2, wherein the backer band has a uniform thickness greater than that of the saw blade rearwardly of its cutting edge but not greater than the thickness of the blade measured at its cutting edge.

8. In a cutoff type band saw machine having a cutting head comprising a rigid frame and an endless flexible saw band on the head, one stretch of which provides a cutting blade that travels lengthwise through a cutting zone, means carried by the frame for guiding the blade through the cutting zone and for supporting the blade against deflection during sawing of a work piece in said zone, comprising:

(A) a pair of rigid members carried by the frame and having portions disposed adjacent to the blade at locations spaced lengthwise thereof;

(B) guide means carried by said portions of the rigid members and engaging the opposite faces of the blade to constrain the cutting span thereof between said portions of the rigid members to linear motion and to inhibit sidewise deflection of the cutting span of the blade during sawing;

(C) a substantially flat elongated backer band extending lengthwise between and rigidly secured to said portions of the rigid members with the backer band coplanar with the cutting span of the blade and with one edge of the backer band in engagement with the back edge of the blade to support the blade against edgewise deflection during sawing, said backer band having a thickness no greater than that of the cutting edge of the blade so as to readily follow the cutting span of the blade through a work piece being sawed by the blade;

(D) a movable entering guide disposed in the space between said portions of the rigid members, said entering guide extending along the length of the backer band;

(E) substantially flat jaws on the entering guide to closely flatwise embrace the backer band and an adjacent portion of the cutting span of the blade, whereby the backer band constrains the entering guide to movement in the flat plane of the backer band;

(F) means biasing the entering guide toward a normal position which it occupies during initial entry of the cutting span of the blade into a work piece being sawed, and at which position the jaws on the entering guide hold the cutting span of the blade against lateral deflection to thus maintain said back edge thereof in engagement with the adjacent edge of the backer band until said adjacent edge of the backer band follows the cutting span of the blade into the kerf sawed thereby;

(G) and cooperating stop means on the backer band and on the entering guide to limit bias produced movement of the jaws of the latter beyond a location at which the jaws are spaced a distance rearwardly from the cutting edge of the blade.

9. The band saw machine of claim 8, wherein the jaws of the entering guide are joined to one another across the other edge of the backer band so that said other edge of the backer band and the means joining the jaws of the entering guide constitute the cooperating stop means to limit bias produced motion of the entering guide.

10. The band saw machine of claim 8, wherein said rigid members have parallel guideways thereon to slidably receive portions of the entering guide and constrain the same to motion relative to the backer band, in the flat plane thereof.

11. The band saw machine of claim 8, further characterized by:
(A) an arm rigidly carried by the frame and spaced from said portion of one of the rigid members along the length of the cutting blade but outside the cutting zone;
(B) and screw threaded means connected between said arm and said one rigid member, through which force can be applied to the backer band necessary to hold it tensioned along its length.

12. The band saw machine of claim 8, wherein screw means reacting between said rigid members holds the backer band tensioned along its length.

13. In a band sawing machine having an endless ribbon-like flexible saw band providing a continuous uniformly thin cutting blade with flat parallel sides, a cutting edge and an uninterrupted back edge, a frame, spaced wheels mounted on the frame and around which the saw band is trained under lengthwise tension, and saw band guide means engaging the sides of the band at lengthwise spaced portions of a stretch thereof to constrain the portion of the saw band between said guide means to linear motion and define the cutting span of the blade, the saw band guide means being adjustable toward and from one another so that the length of the cutting span of the blade may be adjusted to best fit the work, the improvement which resides in:
means for resisting edgewise flexure of said cutting span of the blade resulting from feed force loads imposed upon its cutting edge, to thereby enable a substantially narrow saw band to be operated with high work feed forces, said flexure resisting means comprising:
(A) a substantially flat backer band having a thickness no greater than that of the cutting edge of the saw band, a length greater than the maximum length of the cutting span, a width at least as great as that of the saw band, and a saw band engaging edge;
(B) mounting means connecting the ends of the backer band with the frame to mount the backer band in coplanar relation with the cutting span of the blade with the saw band engaging edge of the backer band longitudinally slidingly engaged with the uninterrupted back edge of the saw band along the cutting span of the blade;
(C) said mounting means being located beyond the saw band guide means and being spaced apart far enough to accommodate the maximum spacing of said guide means so that the length of the cutting span of the blade can be adjusted without interference from and without affecting the backer band; and
(D) connection means reacting between the backer band and the cutting span to keep the saw band from slipping laterally off the saw band engaging edge of the backer band as the blade begins a cut.

14. The band sawing machine of claim 12, wherein said connection means comprises:
(A) a pair of jaw members by which the cutting span of the saw blade and the backer band are held in coplanar relationship,
each of said jaw members having a flat surface; and
(B) means holding the jaw members with their said flat surfaces opposing and parallel to one another and spaced apart to closely receive adjacent portions of the saw band and backer band between them.

15. The band sawing machine of claim 13, wherein said connection means comprises the combination of:
(A) a shallow groove in one of said slidably engaging edges in which the other edge is longitudinally slidably received so that the cutting span of the blade is held against lateral displacement throughout the course of a cut; and
(B) entering guide means having opposing surfaces between which the backer band and a portion of the saw band back of its cutting edge are confined as long as said entering guide means remains in operative position, said entering guide means being detachably engageable with the backer band and said portion of the saw band.

16. The band sawing machine of claim 13, wherein said connection means comprises:
(A) a pair of jaw members, each having a flat surface; and
(B) means holding the jaw members with their said surfaces opposing and parallel to one another and spaced apart by a distance to closely slidably receive adjacent portions of the saw band and backer band between them so that the jaw members can confine the cutting span of the blade and the backer band to coplanar relationship as the saw band is entering a work piece,
and so that the jaw members can be slidingly displaced rearwardly by engagement with the work piece to permit the backer band to follow the blade into the kerf.

17. A band sawing machine comprising the combination of:
(A) a frame having spaced apart portions defining a work receiving throat therebetween;
(B) an endless ribbon-like saw band providing a continuous uniformly thin cutting blade with flat parallel sides, a cutting edge and an uninterrupted back edge, mounted in said frame for endwise movement of a stretch thereof across said throat of the frame to provide a cutting stretch;
(C) a backer band to support said cutting stretch of the blade against the thrust of the work thereon,
said backer band having a thickness no greater than that of the cutting edge of the blade and a length to substantially span said throat;
(D) mounting means for the backer band secured to the ends thereof and attached to said spaced portions of the frame, to mount the backer band behind the cutting stretch of the blade in edge-to-edge engagement therewith;
(E) two side guide means embracing the cutting stretch of the blade at lengthwise spaced portions thereof;
(F) means mounting said side guide means on said frame in positions in which they hold the portion of the cutting stretch of the blade therebetween in coplanar relation with the backer band, so that the backer band can follow into the kerf of a cut made by the cutting stretch of the blade to support the same throughout the course of the cut,
one of said side guide means being adjustable and embracing the backer band as well as the blade; and
(G) means forming part of the mounting means of said adjustable side guide means to guide the same for movement lengthwise of the backer band and the stretch of the blade supported thereby and to secure the same in any selected position along the length of the backer band, so that the distance between the two side guide means may be adjusted without affecting the backer band.

18. The band sawing machine of claim 17, further characterized by means incorporated in the mounting means for the backer band to apply tension to the backer band.

19. The band sawing machine of claim 18, further characterized by
connection means reacting between the backer band and the blade to at all times hold that portion of the cutting stretch of the blade which spans the side guide means, against lateral shifting with respect to the backer band, said connection means comprising a shallow groove in the edge of the backer band in which the uninterrupted back edge of the blade rides.

20. In a band sawing machine, the structure of claim 1, wherein the entering guide is biased towards its operative position embracing the backer band and the cutting span.

21. In a band sawing machine, the structure of claim 1, wherein the cutting span of the blade and the backer band are substantially horizontally disposed during the cutting operation of the machine, and wherein the means mounting the entering guide permits the same to be biased by gravity to its operative position embracing the backer band and the cutting span.

References Cited
UNITED STATES PATENTS

| | | | |
|---|---|---|---|
| 308,188 | 11/1884 | Miller | 143—19 |
| 552,614 | 1/1896 | Hutchinson | 143—19 X |
| 1,061,702 | 5/1913 | Tagger | 143—32 |
| 1,827,490 | 10/1931 | Spencer | 143—17 |
| 2,524,016 | 9/1950 | Hall | 83—201 |

ANDREW R. JUHASZ, *Primary Examiner.*

JAMES M. MEISTER, *Assistant Examiner.*

UNITED STATES PATENT OFFICE
CERTIFICATE OF CORRECTION

Patent No. 3,352,186  November 14, 1967

Charles E. Cleland

It is hereby certified that error appears in the above numbered patent requiring correction and that the said Letters Patent should read as corrected below.

Column 7, line 72, for "of", first occurrence, read -- upon --; column 15, line 58, for the claim reference numeral "12" read -- 13 --.

Signed and sealed this 3rd day of December 1968.

(SEAL)
Attest:

Edward M. Fletcher, Jr.
Attesting Officer

EDWARD J. BRENNER
Commissioner of Patents